United States Patent
Majewski et al.

(10) Patent No.: US 6,180,167 B1
(45) Date of Patent: Jan. 30, 2001

(54) METHOD OF PROVIDING A WEAR-RESISTANT OVERLAY ON A METAL SEALING GASKET

(75) Inventors: Klaus-Peter Majewski, Burscheid; Klaus Schmitt, Grünebach; Markus Heilig, Derschen; Matthias Heike, Vechelde; Klaus Lönne, Burscheid, all of (DE)

(73) Assignee: Goetze Payen GmbH, Herdorf (DE)

(*) Notice: Under 35 U.S.C. 154(b), the term of this patent shall be extended for 0 days.

(21) Appl. No.: 08/880,436

(22) Filed: Jun. 23, 1997

(30) Foreign Application Priority Data

Jun. 26, 1996 (DE) ................................ 196 25 491

(51) Int. Cl.[7] ................................ B05D 3/02; B05D 3/12
(52) U.S. Cl. .................. 427/198; 427/199; 427/357; 427/383.7
(58) Field of Search .................. 277/592; 427/181, 427/192, 199, 198, 360, 367, 370, 383.7, 357; 101/129

(56) References Cited

U.S. PATENT DOCUMENTS

| | | | |
|---|---|---|---|
| 4,810,591 | * 3/1989 | Sakai | 428/652 |
| 4,828,771 | * 5/1989 | Kishima et al. | |
| 5,205,566 | 4/1993 | Ueta et al. | 277/180 |
| 5,302,462 | * 4/1994 | Shah et al. | |
| 5,354,578 | * 10/1994 | Beyer et al. | 427/190 |
| 5,420,191 | * 5/1995 | Howard, Jr. et al. | |
| 5,593,726 | * 1/1997 | Nicholls et al. | 427/189 |

FOREIGN PATENT DOCUMENTS

| | | |
|---|---|---|
| 42 39 944 | 6/1994 | (DE) . |
| 44 40 503 | 3/1996 | (DE) . |
| 195 28 031 | 2/1997 | (DE) . |
| 0 465 268 | 1/1992 | (EP) . |
| 0 486 817 | 5/1992 | (EP) . |
| 0 757 195 | 2/1997 | (EP) . |

* cited by examiner

Primary Examiner—Fred J. Parker
(74) Attorney, Agent, or Firm—Venable; Gabor J. Kelemen

(57) ABSTRACT

A flat metal sealing gasket is made as follows: on an unhardened spring steel plate having an aperture and a bead surrounding the aperture, a sinterable powder is deposited along the bead in a desired shape and thickness. Thereafter a sufficiently high temperature is applied to the deposited sinterable powder to effect sintering or melting of the powder to provide a pressure-resistant overlay on the plate and to simultaneously effect a hardening of the plate.

8 Claims, 1 Drawing Sheet

METHOD OF PROVIDING A WEAR-RESISTANT OVERLAY ON A METAL SEALING GASKET

CROSS REFERENCE TO RELATED APPLICATION

This application claims the priority of German Application No. 196 25 491.4 filed Jun. 26, 1996, which is incorporated herein by reference.

BACKGROUND OF THE INVENTION

This invention relates to a single or multiple-plate flat metal sealing gasket, particularly a cylinder head gasket or a sealing gasket for a flange of an exhaust pipe in internal-combustion engines. The sealing gasket has at least one beaded spring steel plate as a sealing layer as well as overlays of pressure-resistant material provided on at least one of the metal plates for obtaining a high sealing pressure in the region of the gasket apertures.

It is known to make cylinder head gaskets for internal-combustion engines using a single-layer sheet metal or multi-layer sheet metal laminates. For increasing the sealing effect particularly around the gasket apertures which surround the combustion chambers, but also around gasket apertures which surround the liquid passages for the lubricant and coolant as well as apertures for the passage of bolts, it is known to provide the metal plates with embossed beads which surround the gasket apertures. In gaskets formed of sheet metal laminates either all or only some of the metal plates (laminae) may be provided with beads. For obtaining an improved elastic deformation resistance of the beads, at least one of the sheet metal plates is formed of a spring steel while for the other sheet metal plates other types of steel or metal alloys may be used which, if required, may have different mechanical properties.

European Patent No. 0 486 817 discloses a cylinder head gasket formed of a beaded sealing plate having an annular metal compensating disk which is situated on the upper face of the sealing plate and is welded thereto. The beads of the sealing plate are made of spring steel to ensure that they have a substantial elastic resistance to deformation.

When the overlays are welded to the sealing plates according to the prior art, risks are high that the elastic properties of the beads are adversely affected by temperatures prevailing during welding.

SUMMARY OF THE INVENTION

It is an object of the invention to provide an improved flat sealing gasket of the above-outlined type in which the sealing behavior is optimized while, at the same time, the manufacturing costs are lowered.

This object and others to become apparent as the specification progresses, are accomplished by the invention, according to which, briefly stated, the flat metal sealing gasket is made as follows: on an unhardened spring steel plate having an aperture and a bead surrounding the aperture, a sinterable powder is deposited along the bead in a desired shape and thickness. Thereafter a sufficiently high temperature is applied to the deposited sinterable powder to effect sintering or melting of the powder to provide a pressure-resistant overlay on the plate and to simultaneously effect a hardening of the plate.

The material for the spring steel plates is a heat-treatable steel, such as a high grade steel. It may be, for example, a class 1.4021 spring steel. Initially, the sealing plate is in a soft condition, obtainable by cold rolling. The sinterable material which is preferably applied to the sealing plate by a screen printing process and which may be, for example, a powder composition of copper, silicon and manganese, may be deposited on the sealing plate in any desired thickness or configuration. The temperatures required for the sintering or fusion (melting) process are used to simultaneously temper (harden) the soft spring steel plate. Thus, a conventional, separate process step for hardening the sealing plate may be dispensed with. Subsequent to the hardening, the plate may be submitted to annealing. It is also feasible to provide the bead in the plate by an embossing step subsequent to the sintering or melting step.

While the sinter overlays are mostly applied in an annular configuration about gasket apertures which surround the combustion chambers to augment the sealing pressure in those locations, it is feasible to apply the sinter overlays to other regions of the metal plate. Dependent upon the mode of application, the pressure-resistant overlays are combined with beads or elastomer overlays and synthetic resin overlays on the metal plate. In case of multi-plate metal seals the pressure-resistant overlays may be applied to one or more metal plates.

DESCRIPTION OF THE PREFERRED EMBODIMENTS

Figure 1:
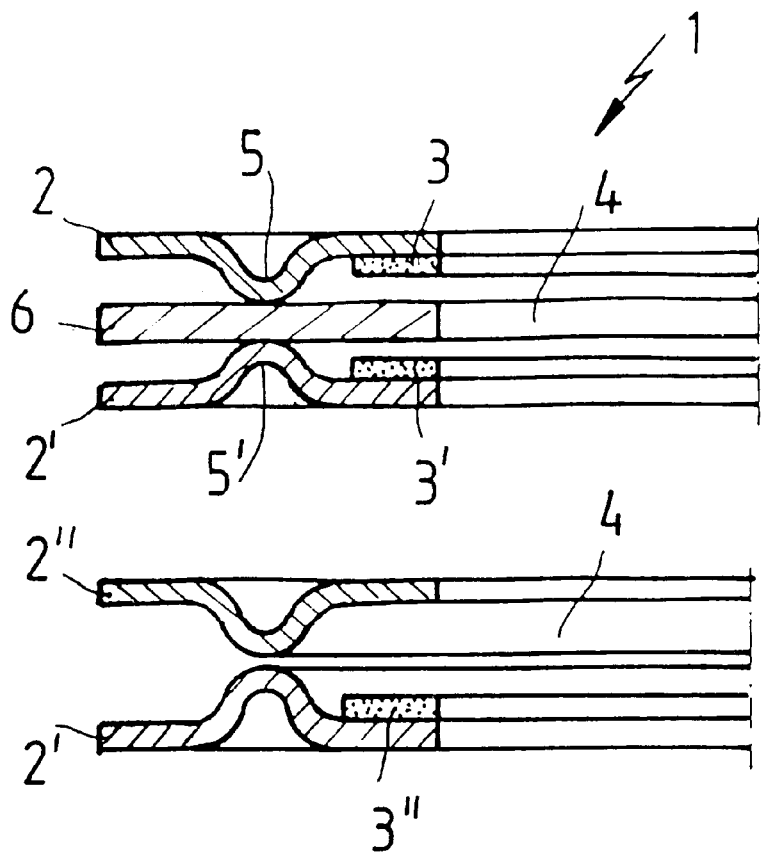
FIGS. 1–4 are sectional elevational views of four preferred embodiments of the invention.

FIG. 1 shows a multi-plate flat sealing gasket (cylinder head gasket) 1 composed of an upper and a lower sealing plate 2, 2' each having a sintered-on or fused-on overlay 3, 3' along the aperture 4 which surrounds a combustion chamber of an internal-combustion engine. The two sealing plates 2, 2' are deformed to obtain respective beads 5, 5' which in a spaced manner surround the gasket aperture and engage an intermediate plate 6 from opposite sides thereof.

Figure 2:
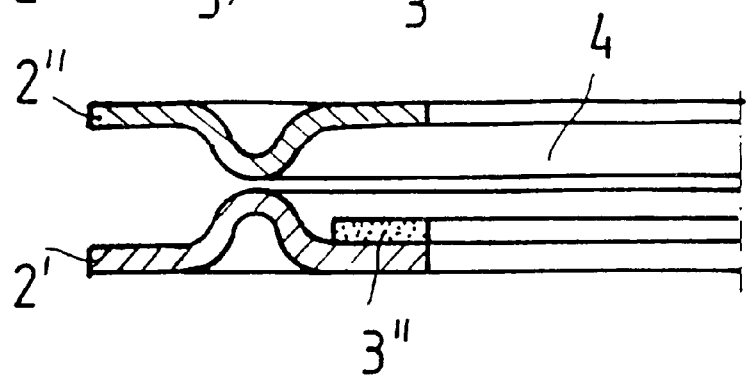

FIG. 2 shows a flat sealing gasket without an intermediate plate. The overlay 3" is arranged only on the lower sealing plate 2'. The number of the metal plates is variable.

Figure 3:
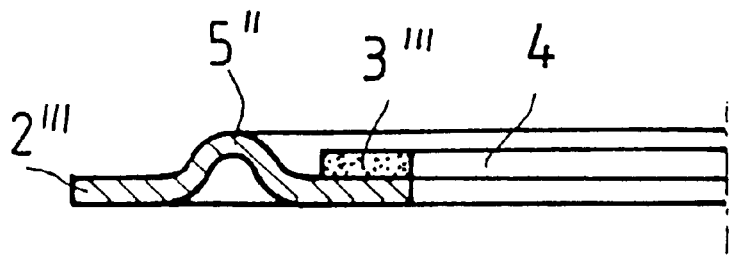
Figure 4:
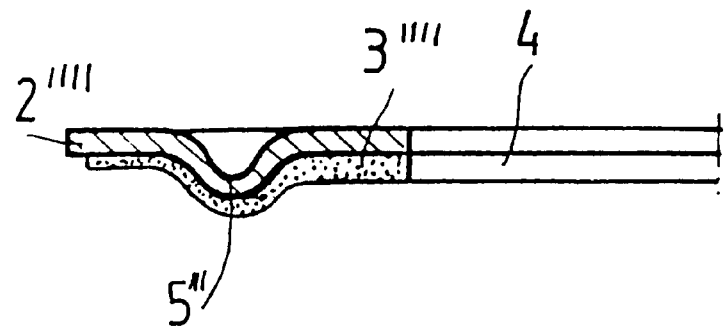

The overlays 3'" and 3"" according to FIGS. 3 and 4 may be also used in single-plate flat sealing gaskets. In the structure according to FIG. 4 the overlay 3"" extends radially beyond the beads 5'".

It will be understood that the above description of the present invention is susceptible to various modifications, changes and adaptations, and the same are intended to be comprehended within the meaning and range of equivalents of the appended claims.

What is claimed is:

1. A method of making a flat metal sealing gasket comprising the following consecutive steps:
   (a) providing an unhardened spring steel plate having an aperture and a bead surrounding the aperture;
   (b) depositing a sinterable metal powder along said bead in a desired shape and thickness; and
   (c) applying a sufficiently high temperature to the deposited sinterable powder to effect one of sintering and melting of the powder to provide an overlay on said plate and to simultaneously effect a hardening of said plate.

2. The method as defined in claim 1, wherein said depositing step comprises the step of screen-printing.

3. The method as defined in claim 1, further comprising the step of annealing said plate, containing the deposited sinterable powder, after said hardening.

4. The method as defined in claim 1, wherein said sinterable metal powder includes a composition of copper, silicon and manganese.

5. A method of making a flat metal sealing gasket comprising the following consecutive steps:

(a) providing an unhardened spring steel plate having an aperture;
(b) depositing a sinterable metal powder along said aperture in a desired shape and thickness;
(c) applying a sufficiently high temperature to the deposited sinterable powder to effect one of sintering and melting of the powder to provide an overlay on said plate and to simultaneously effect a hardening of said plate; and
(d) embossing into said plate a bead surrounding said aperture and extending along the overlay.

6. The method as defined in claim 5, wherein said depositing step comprises the step of screen-printing.

7. The method as defined in claim 5, further comprising the step of annealing said plate, containing the deposited sinterable powder, after said hardening.

8. The method as defined in claim 5, wherein said sinterable metal powder includes a composition of copper, silicon and manganese.

* * * * *